United States Patent [19]

Reichek et al.

[11] Patent Number: 5,701,153
[45] Date of Patent: Dec. 23, 1997

[54] METHOD AND SYSTEM USING TIME INFORMATION IN TEXTUAL REPRESENTATIONS OF SPEECH FOR CORRELATION TO A SECOND REPRESENTATION OF THAT SPEECH

[75] Inventors: Joshua A. S. Reichek, Berkeley; Avi J. Stackenfeld, Richmond, both of Calif.

[73] Assignee: Legal Video Services, Inc., Oakland, Calif.

[21] Appl. No.: 182,393

[22] Filed: Jan. 14, 1994

[51] Int. Cl.⁶ ............................................. H04N 5/782
[52] U.S. Cl. ........................ 348/15; 386/54; 386/65; 360/4; 360/72.2
[58] Field of Search ........................ 358/335; 360/4, 360/72.2; 386/54, 65; 348/15; H04N 5/782

[56] References Cited

U.S. PATENT DOCUMENTS

| | | | |
|---|---|---|---|
| 4,641,203 | 2/1987 | Miller | 358/335 |
| 4,924,387 | 5/1990 | Jeppesen | 364/409 |
| 5,172,281 | 12/1992 | Ardis et al. | 360/72.2 |
| 5,272,571 | 12/1993 | Henderson et al. | 360/4 |
| 5,280,430 | 1/1994 | Woods et al. | 364/419 |
| 5,369,704 | 11/1994 | Bennett et al. | 380/9 |
| 5,444,615 | 8/1995 | Bennett et al. | 364/401 |

OTHER PUBLICATIONS

BusinessWeek —A McGraw–Hill Publication, High–Tech Transcription Will Get Its Day In Court, Jun. 8, 1992.
The New York Times, Josh Kurtz, The Rules Of Evidence Are Being Rewritten, Jun. 7, 1992.
Massachusets Lawyers Weekly, Glenda Leatherman, Revolutionizing The Paperwork Problem, vol. 21, No. 30, Apr. 12, 1993.
Discovery Products —A quizote Company, Imaging Magazine's Products Of The Year, The Editors Of Imaging Magazine Pick The Top Products Of 1992, Feb. 1993.
Synchronize with Discovery Video$^{ZX}$ Post Production, Litigation Support For The Legal Professional$_{TM}$.
Discovery Video$^{ZX}$—Reporter, Video in the Law . . . . The Future is Here!, Litigation Support For The Legal Professional$_{TM}$.
Discovery Video$^{ZX}$, Litigation Support For The Legal Professional$_{TM}$.

*Primary Examiner*—Tommy P. Chin
*Assistant Examiner*—Vu Le
*Attorney, Agent, or Firm*—Wilson Sonsini Goodrich & Rosati

[57] ABSTRACT

The invention pertains to a method and system of inserting a timecode into a textual representation of a speech. The system includes a computer, a timecode generator, and videotape recorder. The computer is coupled with the timecode generator and the videotape recorder. The method includes the following steps. The timecode generator generates the timecode at a point in time. The point in time corresponds to a portion of the speech. The videotape recorder stores a video representation of the portion of the speech with the timecode. The computer receives a text data corresponding to the portion of the speech. The computer being responsive to receiving the text data, inserts a representation of the timecode into the text data.

16 Claims, 6 Drawing Sheets

METHOD AND SYSTEM USING TIME INFORMATION IN TEXTUAL REPRESENTATIONS OF SPEECH FOR CORRELATION TO A SECOND REPRESENTATION OF THAT SPEECH

BACKGROUND OF THE INVENTION

1. Field of Invention

The present invention relates to the field of creating a relationship between a data stream and a reference mark. In particular, the present invention pertains to establishing a relationship between a textual recording of a spoken word and a reference. The present invention also pertains to establishing a relationship between the textual recording of that spoken word and some other recording of that spoken word through the use of a reference.

2. Description of Related Art

Presently, in the area of litigation support, there exist many different systems for generating a textual representation of a person's speech. Most systems require the use of a stenographic machine and a stenographer. The stenographer listens to the person speak, and simultaneously keys in a series of keystrokes, or strokes, into the stenographic machine. Thus, a stenographer creates a textual representation of the person's speech. So that this stenographic data textual representation can later be used by others, a transcribing device is used; that is, a textual transcript (hereinafter referred to as a transcript) of the person's speech is created from the strokes. Often, simultaneously with the stenographic recording, an audio, video, or some other recording, of the person's speech will be created.

Litigation support will often require a textual recording and a video recording of the testimony of a witness, for example. Typically, the stenographer creates a stenographic data representation, or stroke data representation, of the testimony while a videographer creates a video recording of the testimony. After the testimony, the stenographer, or some other person, translates the stroke data into a transcript of the witness' testimony. The stenographer uses a transcribing device to read the stroke data and generate the transcript. Once the transcript is created, the attorneys can use the video recording to review important portions of the testimony.

However, using the video with the transcript, or with the stroke data, presents a significant problem. A line number in the transcript, or a stroke in the stenographic data, provides no information regarding the corresponding position in the video tape. For example, if the witness's testimony continued for several days, hundreds of pages of transcripts and hours of video tape will be generated. If an attorney wants to review the video tape of the testimony corresponding to page 94, line 15, of the transcript, for example, the attorney may have to search through hours of video tape to find the corresponding video recording. Similarly, if an attorney is reviewing a video tape of the testimony, and that attorney wishes to locate the particular line number in the transcript, the attorney may have to search pages and pages of transcript to ensure that the correct line number is found.

Therefore, what is needed is a method of creating a relationship between a textual representation of the spoken word, and some other recording (e.g. audio or video) of that same spoken word. This problem has been recognized and one system has been developed in an attempt to solve the problem of associating a transcript with a video recording. FIG. 1 illustrates a prior art system used to correlate stenographic data with video signal input. This system is available from Stenograph Legal Services, Inc., of San Ramon, Calif.

A stenographic machine 110 is connected to a computer 130. These stenographic machines are available from Stenograph Inc. of Chicago, Ill. The computer 130 can be an IBM compatible, or Macintosh, computer. A video camera 120 is connected to a PC-VCR 140. One supported PC-VCR is the NEC PC-VCR (model PV-S98A).

Prior to using a video tape in PC-VCR 140, the video tape must be preconditioned. That is, each tape must be inserted in the PC-VCR 140. The system writes a synchronization header onto the video tape. After the header, pulses are recorded on the rest of the video tape. These pulses are understood to each be substantially the same. That is, by itself, each pulse is not uniquely identifiable. To determine the difference between two pulses, the tape must first be rewound and the header must be found. The number of pulses from the header of the tape is counted for each of the two pulses. Therefore, one pulse may be the fifth pulse from the header, while the other pulse may be the 300th pulse from the header.

After the tape is preconditioned, the tape is rewound and the system can be used. PC-VCR 140 can begin the video recording of testimony. While recording, PC-VCR 140 transits a signal to computer 130. The signal includes an indication that the header has been detected, and a indication for each pulse detected on the video tape. Simultaneously, a stenographic machine 110 receives keystrokes from a stenographer (not shown). The stenographer keys a textual representation of the testimony. Computer 130 receives the signals from PC-VCR 140 and the stroke data. Computer 130 counts the number of pulses received from PC-VCR 140 and creates a separate index file. The index file stores the relationship between the number of pulses from the header to the position on the video tape where the video signal is being stored, and the corresponding stroke data.

The above solution has a number of disadvantages. First, the video tape must be preconditioned. This requires setup time; adds complexity to the process, and requires special hardware. Therefore, what is needed is a system that does not use a preconditioned video tape. Along this line, what is desired is a system that employs some industry standard method of marking the video tape whereby the complexity of the system is reduced.

Second, the prior art system is difficult to expand. It is unclear how a video recording and a separate audio recording could both be matched to a transcript, because the reference pulses are put only on the video tape in PC-VCR 140. Therefore, what is needed is a system that allows for multiple separate recordings of a speech to be correlated with a textual recording of a speech.

Third, the prior art system is subject to information loss. For example, if a portion of the video tape is damaged after the video record is created, the pulse count will be incorrect. This will cause the correlation between the transcript and the remaining portion of the video tape to be incorrect. Therefore, what is needed is a system that does not rely merely on counting pulses from a header.

Fourth, reviewing the video record can be time consuming because a relative reference frame has been used. For example, assume testimony is recorded on two video tapes. If a reviewer wishes to switch from reviewing one section of the transcript on the first video tape, to another section on the second video tape, the second video tape must be rewound to the header. The second video tape would then be scanned, while the computer counted the pulses, until the desired location is found. Further, if the reviewer wished to return to a section of the transcript on the first video tape, the first video tape must be rewound to the header and the pulses recounted until the location is found. Therefore, what is needed is a system that more easily allows a reviewer to review the transcript and video tape.

Fifth, a separate file must be created that stores the relationship between the stroke data and the video recording. This requires additional file space and file maintenance. As well, this requires a transcribing device to maintain the relationship between the stroke data and the video tape. Therefore, what is needed is a system that does not employ a separate file to store the relationship between the textual recording and the video tape.

A method and apparatus for efficiently synchronizing a first stream of data with a second stream of data is desired.

SUMMARY OF THE INVENTION

A method and apparatus for efficiently synchronizing a first stream of data with a second stream of data is described.

One embodiment of the present invention includes a system for correlating a first data from a first input device with a second data from a second input device. The system includes the first input device, the second input device, and a reference mark generator. The reference mark generator is coupled to the first input device and the second input device. The reference mark generator is for generating a reference mark. The reference mark generator is further for storing a relationship between the first data and the second data.

In another embodiment, the second data includes textual data. The textual data can include stenographic data and the textual input device can include a stenographic machine. In another embodiment, the textual input device includes a voice recognition system and the textual data includes a stream of words.

In another embodiment, the first input device includes a video camera and a video tape recorder (VTR), and the VTR is for storing the reference mark. In another embodiment, the first input device includes a microphone and a tape recorder, and the tape record is for storing the reference marks.

In another embodiment, the reference mark includes a time code. This reference mark can be stored in any of a number of standard (e.g. SMPTE—Society of Motion Picture and Television Engineers, EBU—European Electronics Standards Association, MIDI—Music Interactive Digital Interface or EIA—Electronic Industries Association) or nonstandard formats.

In another embodiment where textual data is used, the textual data can include a plurality of codes. In one embodiment, the reference mark generator generates and stores a reference mark for each one of the plurality of codes. In another embodiment, the reference mark generator only stores a reference mark for some of the plurality of codes. In another embodiment, textual data includes change of state indicators. These change of state indicators can include: a question, an answer, a colloquy, a speaker identification, a punctuation mark, a number, or a stroke.

Another embodiment includes a system for generating a relationship between a first data stream and a textual data stream. The first data stream includes a first representation of a word. The textual data stream includes a corresponding textual representation of the word. The system comprises: a first input device, a second input device, a time code generator, and a first recording device, and a textual recording device.

In another embodiment wherein the reference mark includes a time code and the reference mark generator further includes the following: a time code generator for generating the time code; a first storing device being coupled to the time code generator (the first storing device for storing a first representation of the time code in the first data), and a computer being coupled to the time code generator. The computer is for generating a textual representation of the time code. The computer is further for storing the textual representation of the time code in the textual data. In one embodiment, the time code includes hours, minutes, second, and frame or fraction of seconds. The computer can convert these elements into textual representations and store these representations with the textual data.

Another embodiment includes a method for accessing a time code associated with a position in a textual data stream. The textual data stream includes one time code. First, the textual data stream is accessed, and a position in the stream is located. Then the time code is accessed at, or near, the position.

Another embodiment includes a method of accessing a first position in a first recording of speech and accessing a corresponding textual position in a textual recording of the speech. First, the position in the first recording is accessed. Then, an associated absolute reference mark is identified. The absolute reference mark is then located in the textual recording. The corresponding position in the textual recording is then accessed.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview

A method and apparatus for efficiently synchronizing a first stream of data with a second stream of data is described. In the following description, numerous specific details are set forth such as stroke codes, time code standards, etc., in order to provide a thorough understanding of the present invention. It will be obvious, however, to one skilled in the art, that the present invention may be practiced without these specific details. In other instances, well-known video cameras, time code generators, VTR's (video tape recorders), computers, circuits, structures and techniques have not been shown in detail in order not to unnecessarily obscure the present invention.

System Overview

Figure 1:
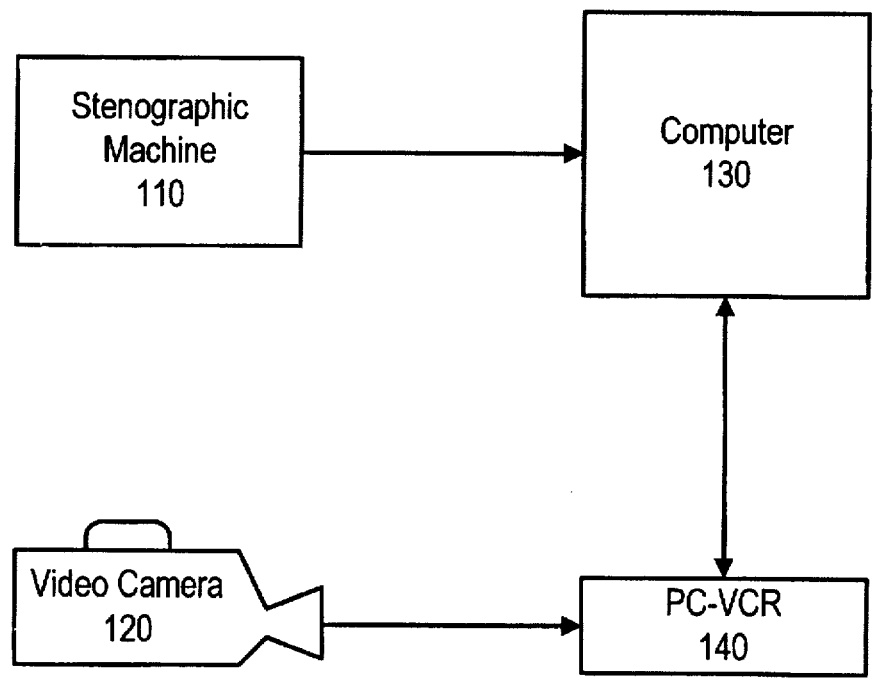
FIG. 1 illustrates a prior art system used to correlate stenographic data with video signal input.
Figure 2:
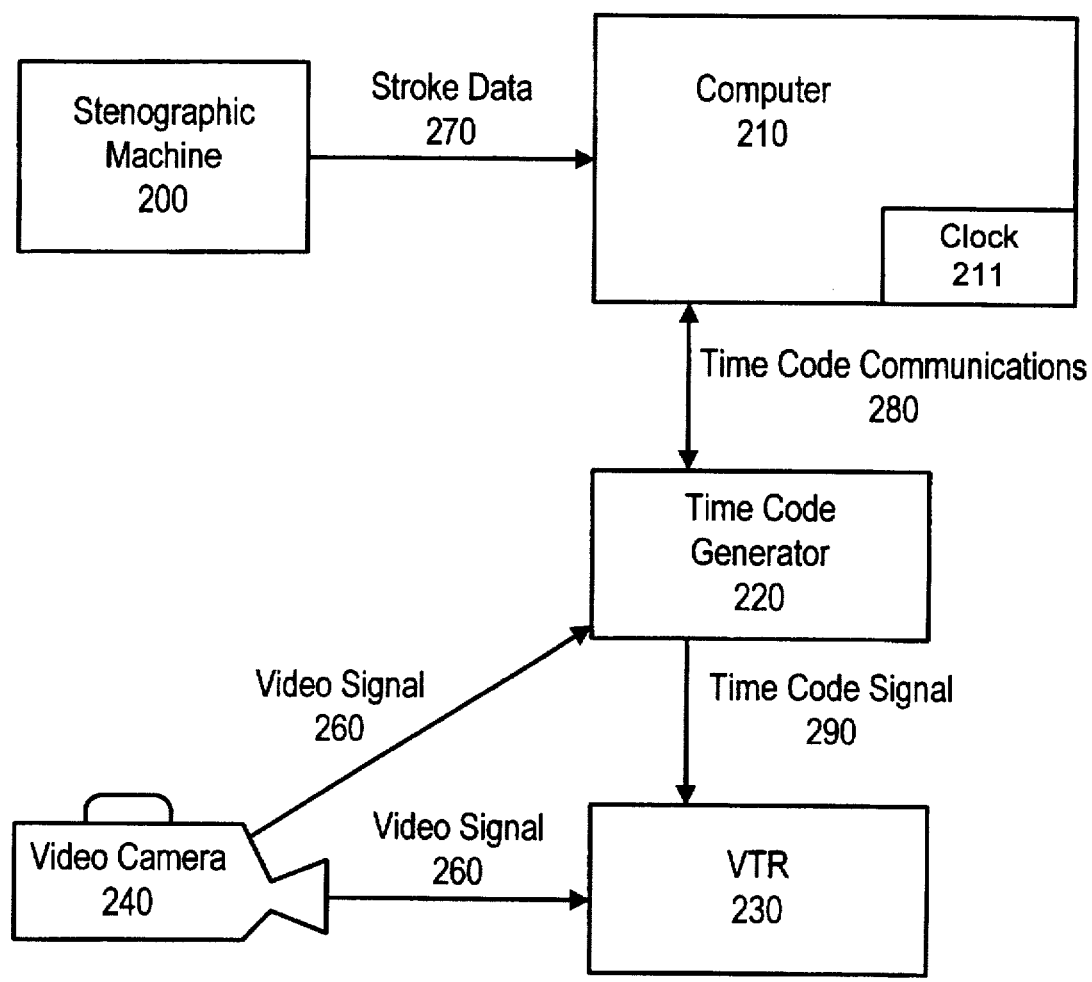
FIG. 2 illustrates an embodiment of the present invention wherein stenographic data is correlated with a video signal using a time code generator.

FIG. 2 illustrates an embodiment of the present invention wherein stenographic data is correlated with a video signal using a time code generator. This system allows a video recording of a spoken word to be correlated with a textual representation of the spoken word.

In one embodiment of the present invention, a videographer operates video camera 240 and VTR (video tape recorder) 230. A stenographer operates stenographic machine 200. During normal operations, the videographer ensures that a video recording of a spoken word is captured on VTR 230, while the stenographer ensures that a textual recording of that spoken word is captured via stenographic machine 200. In another embodiment of the present invention, the stenographer performs the duties of above stenographer and the above videographer.

In one embodiment, stenographic machine 200 communicates with computer 210 via RS-232. Time code generator 220 couples to computer 210 via an RS-232 communications connection. Video camera 240 couples to time code generator 220 and to VTR 230. RS-232 is a well-known standard. However, RS-422, RS-449, or some other communications protocol, can also be used to communicate between the various components of the system. What is important is that the various components communicate information between themselves. Therefore, although specific references are made throughout this specification to RS-232 and RS-442 communications protocols, any standard or non-standard communications protocol can be employed.

Stenographic machine 200 generates a stream of stroke data 270. In one embodiment of the present invention, stenographic machine 200 has an electronic output such as RS-232. Stenograph Incorporated, of Chicago, Ill., supplies such stenographic machines. Stenographic machine 200 generates stroke data 270 and transmits this data to computer 210. RS-232 is a well-known communications standard. The stenographic machine 200 has a connection such as an RJ-11 or RJ-45 jack. These jacks are well-known standard connectors for carrying electrical signals. However, as with the communications protocol, any type of connector carrier combination can be used (e.g. a 9-pin D connector supporting RS-232 or RS-422, radio transceiver supporting radio communications, optical transceivers supporting optical communications).

Stenographic machine 200 is used for capturing the textual recording of the spoken word. It is important to note that the stenographer need do nothing more than what was done previously when keying a stenographic recording of the spoken word. That is, the stenographer need only enter the keystrokes previously entered. This is a distinct advantage, of this embodiment of the present invention, in that the complexity of the system is minimal.

Computer 210 can be any processing device capable of communicating with stenographic machine 200 and time cede generator 220 (e.g. via an electronic interface such as RS-232). In one embodiment of the present invention, an IBM compatible 486DX personal computer is used. Computer 210 includes two RS-232 communications ports. One port is used to communicate with stenographic machine 200. The other port is dedicated to communications with time code generator 220. Computer 210 is used for examining, and storing, the stroke data 270 from stenographic machine 200, and for controlling time code generator 220. In one embodiment, computer 210 includes an internal clock 211. Clock 211 can be used to initialize time code generator 220 with a starting time code.

In another embodiment of the present invention, computer 210 includes an internal time code generator. In this embodiment, computer 210 would receive video signals directly from video camera 240 and would transmit time codes directly to VTR 230.

External time code generator 220 generates time codes. These time codes typically include an hour, minute, second, and frame or fraction of a second. (A frame is a frame of a video signal. During normal playing, displaying a frame requires approximately 1/30 of a second.) Time code generator 220 typically includes an RS-232 communications port. Time code generator 220, when requested by computer 210, will provide a time code to computer 210. Time code generator 220 receives video signal 260 from video camera 240 and generates time codes that are recorded by VTR 230. In one embodiment of the present invention, the time codes are generated for VTR 230 according to the SMPTE (Society of Motion Picture and Television Engineers) standard. External time code generators are available from: ARTI of Sunnyvale, Calif.; Adrienne Electronics of Nevada City, Calif.; Gray Engineering of Grange, Calif.; Cipher Digital of Bethesda, Md.; Sony; JVC, and Panasonic.

In another embodiment of the present invention, the time code generator is inside computer 210 (an internal time code generator). Horita of Mission Viejo, Calif.; ARTI of Sunnyvale, Calif., and Adrienne Electronics of Nevada City, Calif., supply internal time code generators. In another embodiment, VTR 230 includes a time code generator. For these embodiments, what is important is that time codes are generated and communicated to the components storing video signal 260 and stroke data 270.

Video camera 240 and VTR 230 are commercially available. Video camera 240 generates video signal 260 of the subject to be recorded (also referred to as the subject). That is, video camera 240 generates a stream of data representing the subject to be recorded. Typically, video signal 260 includes audio signals. VTR 230 records video signal 260 with time code signal 290. Storage of the time code on the video recording in VTR 230 is a well-known technique in the broadcast industry. In one embodiment, the videographer need only operate the video equipment and start a capture program on computer 210.

Once video recording on VTR 230 has begun, time code signals 290 are recorded on the video tape. Note that in this embodiment, no preconditioning of the video tape is required. In one embodiment of the present invention, the VTR 230 records a time code on an audio channel or specialized track for time code data. This is known as LTC (Longitudinal Time Code). In another embodiment of the present invention, the VTR 230 stores a time code in every video frame. This is known as VITC (Vertical Interval Time Code). Both LTC and VITC are well-known. Adding time codes to a video signal is a well-known technique. VITC requires more expensive equipment but ensures a subsequent search of the video tape will be more accurate than LTC stored time codes. In another embodiment, time codes are stored using both LTC and VITC. Typically, video camera 240 is connected to time code generator 220 so that time codes are "locked" to video signal 260, as required under SMPTE standards. Embodiments using SMPTE, or other standards, have the advantage of reducing the complexity of the system by using standard techniques for storing the time codes on the video recording, thereby, reducing the complexity of the system.

The present invention does not require the use of the SMPTE standard, or any other particular standard. The time codes can be stored on the video tape using any one of a number of standard or non-standard techniques. For example, in another embodiment of the present invention, the time codes are stored in EBU (European Electronics Standards Association) format. In other embodiments of the present invention, other standards are used to mark the video tape. These formats include EIA (Electronic Industries Association), MIDI (Music Interactive Digital Interface), NBS (National Bureau of Standards) defined standards. These embodiments have the advantage of using industry standards that allow for the use of standard equipment in the system. This reduces the cost and complexity of these embodiments. However, all that is important is that the video tape is marked using some format where that marking can also be represented in a textual recording of the spoken word.

In another embodiment of the present invention, the functions of VTR 230, video camera 240 and time code generator 220, are included in one device. Such systems are presently commercially available.

In another embodiment, the functions of computer 210, time bode generator 220, and VTR 230, are included in one device. Video camera 240 connects directly to this device.

Although only one video recording device has been included, the invention is not limited to only one non-textual recording. Rather, because this embodiment employs industry standard time codes, multiple recordings of the spoken word can be simultaneously synchronized. For example, audio recording equipment can be connected to time code generator 220, allowing the synchronization of a separate audio recording with the textual recording of the spoken word. Similarly, this invention is not limited to only one textual recording. Rather, two or more textual recordings, e.g., a stenographer and a speech recognition system, can be correlated to one, or more, non-textual recordings of the speech. Therefore, this embodiment has the advantage of being expandable to allow the correlation of multiple separate recordings of a speech with textual recordings of the speech. For example, a speech given at an international conference may be audio, video, and stenographically recorded, while simultaneously, multiple translators are translating the speech. Each of these translations would also be audio and stenographically recorded. Where only one translation was required, at least two textual representations of the speech would need to be correlated with at least a single audio/video recording. One embodiment of the present invention can accommodate this.

A Stenographic Machine Accepting Time Codes

In another embodiment of the present invention, stenographic machine 200 directly accepts time code communications 280. That is, stenographic machine 200 incorporates the functions of computer 210. Stenographic machine 200 thereby provides stroke data 270 including stroke codes indicating time codes. In another embodiment, stenographic machine 200 includes a memory for storing stroke data 270. Examples of a memory are a floppy disk drive, an optical disk drive, flash memory, or RAM. Stenographic machine 200 controls time code generator 220.

Figure 3:
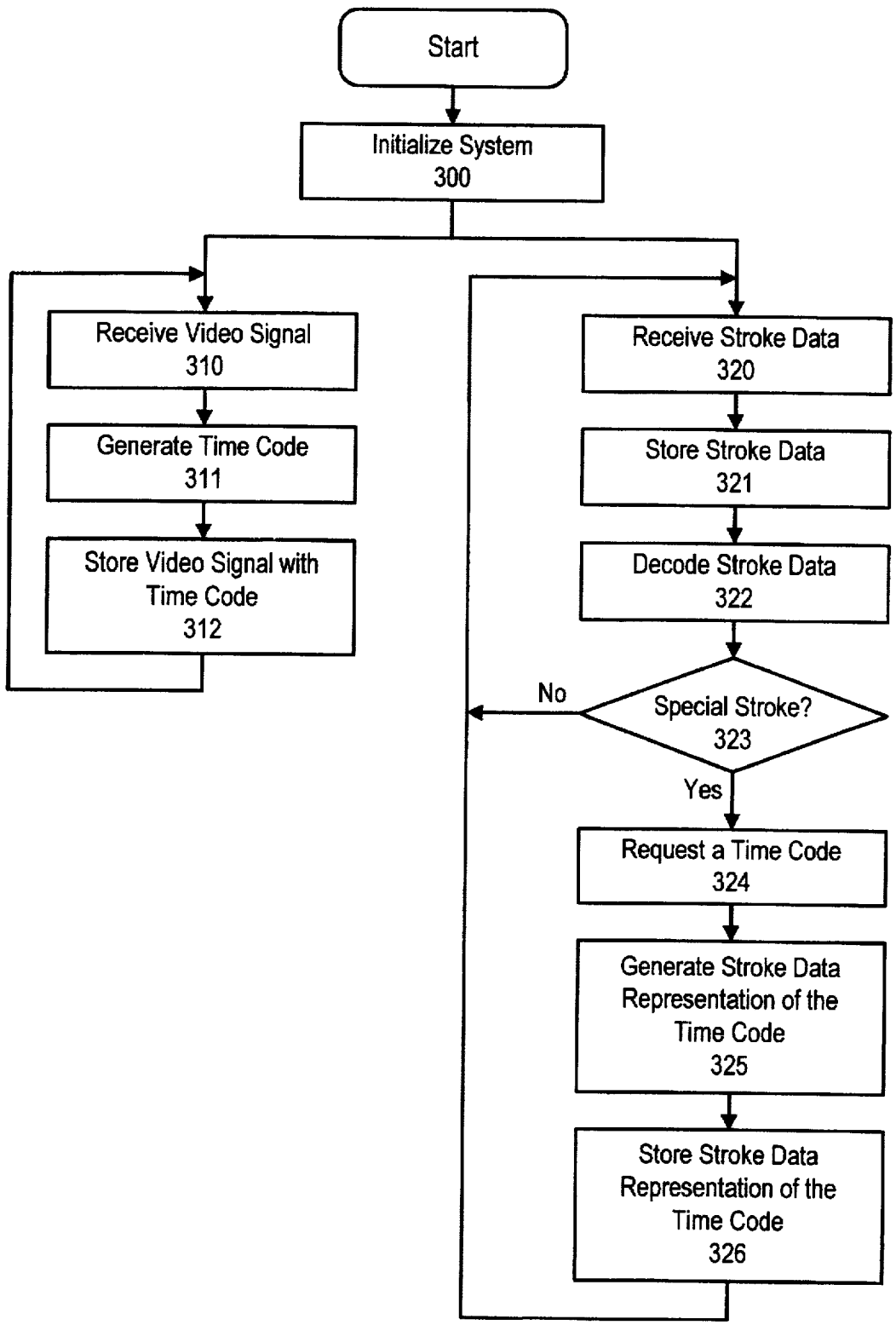
FIG. 3 illustrates an embodiment of a method of creating a relationship between stenographic data, or stroke data, and a video signal using a time code generator.

One Embodiment of a Method of Creating a Relationship Between Stenographic Data and a Video Signal FIG. 3 illustrates an embodiment of a method of creating a relationship between stenographic data, or stroke data, and a video signal using a time code generator. (A stroke includes one or more keystrokes entered by the stenographer. For example, for one stroke, the stenographer must hit nine keys approximately simultaneously. For a different stroke, the stenographer must hit one key.) Therefore, in one embodiment, a stroke datum includes one stroke. In another embodiment, a stroke datum includes multiple strokes.

At step 300, the system of FIG. 2 is initialized. Computer 210 is started and a program begins execution. Video camera 240 is turned on and begins transmitting video signal 260. Time code generator 220 is reset. Time code generator 220 is set by computer 210 to the value of clock 211. In one embodiment, time code generator 220 can be set to a different start time (e.g. where the videographer wishes to start the time codes from 00:00:00:00, as opposed to the present time of day). VTR 230 is turned on and begins recording video signal 260, and recording time code signal 290 in relation to, or with, the video signal. Stenographic machine 200 is readied to begin transmitting stenographic data.

At step 310, the video signal of the person to be recorded, via video camera 240, begins to be captured on VTR 230.

At step 311, time code generator 220 generates a time code.

At step 312, VTR 230 stores the time code. Typically, a time code is stored for every frame of video signal 260. In another embodiment, where an audio signal is being recorded, the time code is stored for every fraction of a second (or every frame). Steps 310 through 312 are continuously repeated while the system is running.

While steps 310 through 312 are repeating, steps 320 through 326 are repeating. At step 320, stenographic machine 200 begins transmitting a stenographic representation of the subject's words. Thus, computer 210 receives data for each stroke from stenographic machine 200.

At step 321, the stroke data is stored by computer 210. See the below discussion on the format of the stored stroke data 270.

At step 322, computer 210 decodes the stroke data to determine if the stroke is a special stroke (see below for more information on special strokes and their use).

At step 323, computer 210 determines if the received stroke data is a special stroke. If the stroke data is not a special stroke, then computer 210 prepares to receive the next stroke data, step 320.

If the stroke data is a special stroke, computer 210 requests a time code from time code generator 220. The time code generator 220 replies with the time code that is to be saved with the corresponding frame of video signal 260. For example, the time code generator may supply a time code of 00050218. (For better clarity of further examples, a time code will be represented with ':'. For example, 00:05:02:18.) This time code indicates zero hours, five minutes, two seconds, and eighteen frames or fractions of a second. This ensures that the stroke entered by the stenographer, will be associated with a corresponding section of the video tape.

At step 325, computer 210 generates stroke data representations of the time code. Typically, this representation includes stroke data for the hours, minutes, seconds, and frame or fraction of a second, of the time code. In one embodiment, the time code is represented as eight strokes.

At step 326, computer 210 stores stroke data representations of the time code. The system then returns to step 320. In one embodiment of the present invention, the stroke data representations of the time code are stored following the stored special stroke data. Note that the next received stroke data, starting at step 320, will be stored following the time code representation. Thus, the time code representations become integrally stored with the textual representation of the speech. The discovery of this technique gives this embodiment of the invention a significant market advantage because standard transcribing devices and/or software can be used to transcribe the stored stroke data. The transcribing device processes the stroke data, with time code representations embedded in the stroke data, as it would process any other stroke data. Therefore, no modifications need to be made to the vast majority of presently available transcribing devices.

Using this method, special strokes are associated with a position on the video tape. A person having located a specific special stroke in the stored stroke data, can easily locate the corresponding position on the video tape.

In another embodiment of the present invention, time codes are stored with each stored textual datum. It has been discovered that this embodiment is particularly useful where experimental data is being recorded. For example, where pictures of weather patterns are being recorded while weather instruments collect textual, or other data, it can be critical that each datum have a time code associated with it.

Decoding the Stenographic Input

Generally, reviewers of a transcript are particularly interested in starting review at certain points in a transcript; for example, the beginning of a question, a change in the person speaking, or the end of a sentence. Recognizing this as an important feature, one embodiment of the present invention effectively uses this characteristic of the typical review process to optimize the mount of information stored. By recording time codes only after these "special strokes," computer 210 need store substantially fewer time codes, with the stroke data, than would be required if a time code were stored with every stroke.

Stenographers use unique strokes to indicate particular changes of state in the textual recording of the spoken word. For example, stenographers use certain strokes to indicate a change in the speaker where multiple speakers are present. Through extensive experimentation, certain of these change of state strokes have been discovered to be particularly useful to reviewers. These strokes include:

speaker id—as described above;
question—a question has been asked;
answers—an answer has been given;
colloquy—a formal discussion between speakers;
number—a number has been spoken;
punctuation—end of a sentence, a question mark, and
ids (optional)—specific strokes used by the stenographer to indicate a particular event; for example, an objection has been made, or that the speech has gone on, or off, the record.

In this embodiment of the present invention, computer 210 decodes the stroke data 270. Computer 210 searches for the above specific strokes, and only associates a time code with identified special strokes. In this manner, strokes are stored with those changes of state in which reviewers of the transcript are most interested. This reduces the size of the file storing the stroke data and the amount of processing required to generate the file. In embodiments where the time codes are displayed during later review, this also makes the transcripts simpler to read when compared with a system that records time codes for each stroke data.

Table 1 illustrates the hexadecimal representation of some special strokes.

TABLE 1

| Stroke | Byte Representation (base 16) |
|---|---|
| Question | CF, F8, C0, C0 |
| Answer | C0, C0, CF, FC |
| Colloquy | C0, C0, C5, D4 |
| Period | C0, C0, CA, E8 |
| ? | CD, D0, C0, C0 |
| Speaker 1 | C0, C0, FA, E8 |
| Speaker 2 | CD, D5, C0, C0 |
| Speaker 3 | CA, EE, C0, C0 |
| Speaker 4 | C0, C0, F5, D4 |

In one embodiment, the above codes are represented as four six-bit words. This invention is not limited to the above codes or the above byte representations.

In another embodiment of the present invention, computer 210 inserts a time code for only the first of a contiguous series of the same special strokes. This occurs, for example, when a stenographer erroneously double keys. For example, the stenographer erroneously keys in two '?', one immediately following the other.

In another embodiment of the present invention, a time code is inserted for only the fast of a series of contiguous special strokes. This occurs, for example where a punctuation mark is followed by a speaker id.

Format of the Stored Stroke Data

Figure 4:
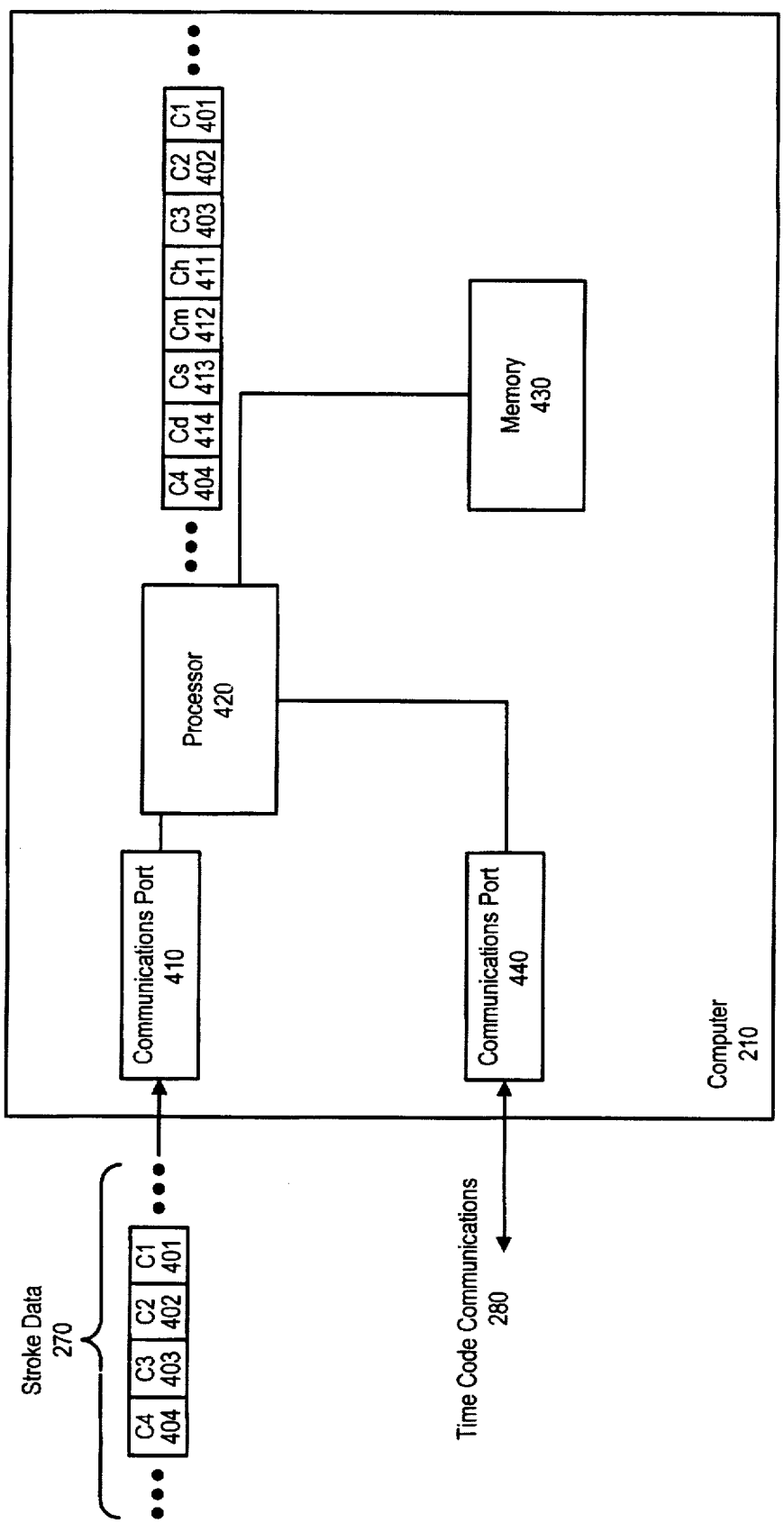
FIG. 4 illustrates a logical view of computer 210.

A distinct advantage of the present invention is that no separate fie is required to store the relationship between the stream of stroke data 270 and the time codes. Rather, computer 210 inserts, in stroke data 270, a series of stroke codes representing a time code. This obviates the need for a separate file to store the relationship between the stroke data 270 and the video signal 260. However, in another embodiment of the present invention, a separate file is used to store the relationship. FIG. 4 illustrates a logical view of computer 210 wherein no additional special file need be created.

A portion of the stream of stroke data 270 is represented by stroke data, or stroke codes: C1 401, C2 402, C3 403, and C4 404. These stroke codes represent strokes keyed in by the stenographer. As mentioned previously, a stroke includes one, or more, keystrokes. Communication port 410 receives these stroke codes and transits them to processor 420. Processor 420 stores arriving stroke codes in memory 430. Memory 430 can be any type of memory; for example, a hard disk drive, RAM, flash memory, or an optical disk.

Processor 420 will simply store C1 401 and C2 402 directly to memory 430 soon after the codes arrive. Processor 420 will then decode C3 403. For the purpose of illustration, C3 403 will represent special stroke code, e.g., '.'. Next, processor 420 will request a time code from time code generator 220. (In another embodiment, computer 210 includes a time code generator. Typically, processor 420 then requests time codes over an internal bus.) Time code generator 220 will provide a time code via communications port 440 and time code communications 280. Typically, communications port 410 and communications port 420 support RS-232 or RS-422 communications. Processor 420 converts the time code into stroke codes, represented by stroke codes Ch 411, Cm 412, Cs 413, Cd 414. Ch 411 is the stroke codes representing the hours of the time code. Cm 412 is the stroke codes representing the minutes of the time code. Cs 413 is the stroke codes representing the seconds of the time code.

Cd 414 is the stroke codes representing the frames or fractions of a second of the time code. Processor 420 stores C3 403 in memory 430 and then stores Ch 411, Cm 412, Cs 413, and Cd 414. Processor 420 then simply stores C4 404 in memory 430.

Assume, for purposes of illustration, that the time code received is 00050218. The computer would insert the Table 2 representations into stroke data 207.

TABLE 2

| Stroke Code | Number Represented (base 10) | Byte Representation (base 16) |
|---|---|---|
| Ch 411 | 00 | D0 C2 C0 C0 D0 C2 C0 C0 |
| Cm 412 | 05 | D0 C2 C0 C0 D0 C4 C0 C0 |
| Cs 413 | 02 | D0 C2 C0 C0 D4 C0 C0 C0 |
| Cd 414 | 18 | D8 C0 C0 C0 D0 C0 C0 E0 |

Note that no separate file is required in this embodiment. Rather, the stored stroke data is compatible with existing stenographic systems. Thus, when a transcribing device is used to transcribe the stroke data, standard commercially available systems can be used. Such transcribing devices are available from Stenograph Incorporated of Chicago, Ill. The time codes will appear in the transcript as an hours, minutes, seconds, and frame or fraction of a second representation. In one embodiment, key codes for ':' are also inserted between the hours, minutes, seconds, and frame or fraction of a second stroke codes. This provides better readability of the codes in the transcript.

Figure 5:
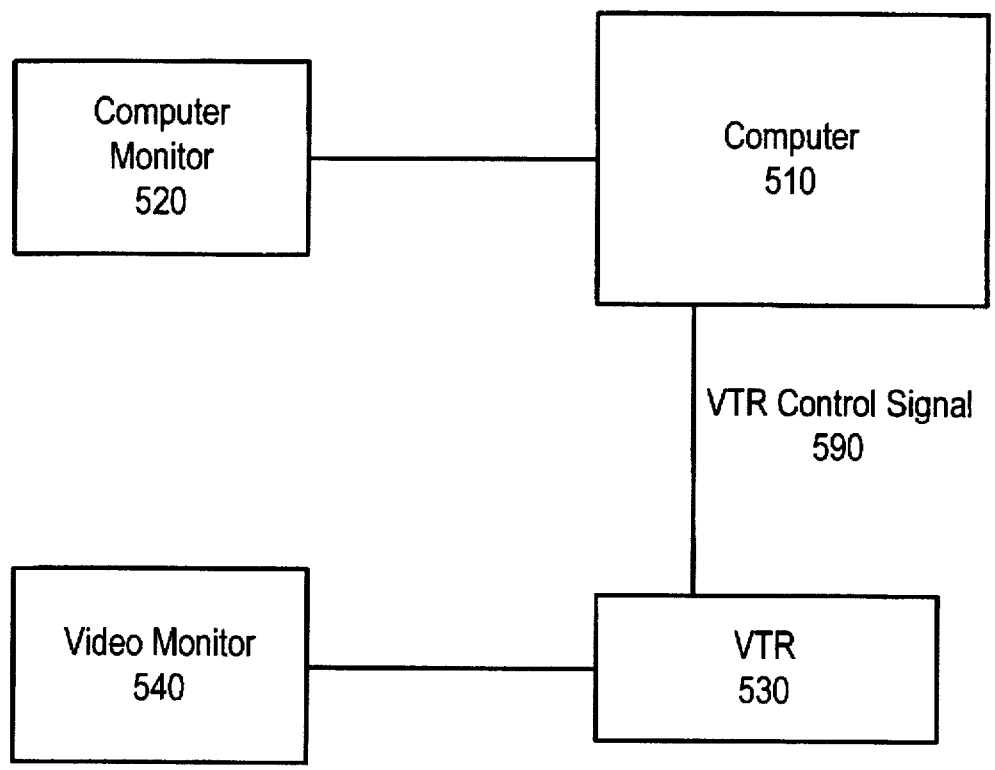
FIG. 5 illustrates one embodiment of a system for reviewing a textual representation of the spoken word with another recording of that spoken word.

One Embodiment of a System for Reviewing a Textual Representation of the Spoken Word with Another Recording of that Spoken Word FIG. 5 illustrates one embodiment of a system for reviewing a textual representation of the spoken word with another recording of that spoken word. As mentioned previously, after the stenographic record of a speech is created, the stenographer will use a transcribing device to transcribe the data. Typically, an electronic version of the transcript will be created. The transcribed transcript created, using one embodiment of the present invention, includes textual representations of time codes. In this embodiment, the textual time code representations appear after change of state indicators. For example, the following may be included in the transcript (The spaces after the 'Q.' and the '?', have been added by the transcribing device in this example. Generally, transcribing devices insert such spaces.):

```
...
Q. 00:05:02:18 Is John Smith your complete name? 00:05:03:25
...
```

Computer 510 includes an electronic version of the transcript. This is typically stored in RAM, ROM, flash memory, or a disk drive, but can be stored in any electronic media. The electronic version of the transcript is typically in a word processor format such as WordPerfect, available from WordPerfect Corporation of Orem, Utah, or Word, available from Microsoft Corporation of Redmond, Wa. In any case, the computer displays the electronic version of the transcript on computer monitor 520 so that a reviewer may read the transcript.

VTR 530 includes a video recording of the subject speaking. This video recording corresponds to the transcript. For example, if the video recording is a video recording of a deposition, the transcript would be the transcript of that deposition. When playing the video recording, VTR 530 transmits a video signal to video monitor 540. The video monitor 540 displays the video signal. VTR 530 and video monitor 540 are commercially available products.

Computer 510 also includes a VTR control board, or VTR control software, capable of generating VTR control signal 590. In one embodiment, VTR control signal 590 sends instructions to VTR 530 to go to a particular frame. Such VTR's are available from Sony, JVC, and Panasonic. Such controllers are available from ARTI of Sunnyvale, Calif., Diaquest of Berkeley, Calif., and Videomedia of Sunnyvale, Calif. In another embodiment, computer 510 is a specialized computer that controls VTR 5301 as is available from Sony, JVC, Panasonic, etc. In another embodiment, computer 510 communicates with an external VTR controller.

Given a specific time code, the VTR control board generates VTR communications signal 590, causing VTR 530 to locate the position of the video tape corresponding to that time code.

Similarly, if a location on the video recording is found, the reviewer is able to locate a corresponding position in the transcript VTR 530 transmits VTR communications signal 590, including information about the time code corresponding to, that location on the video tape. Computer 510 receives communications signal 590 and searches the electronic transcript for the nearest corresponding time code. The location in the text corresponding to that nearest time code is then displayed on computer monitor 520.

In another embodiment of the present invention, computer 510 includes a video board allowing computer monitor 520 to display both the text and video signals. In this embodiment, the functions of video monitor 540 would be performed by computer 510 and computer monitor 520.

In another embodiment of the present invention, the reviewer need only have a printed paper version of the transcript to locate a corresponding position on the video tape. In this embodiment, given a time code, VTR 530 will search the video tape. Although not necessary in other embodiments, the paper transcript must have the textual representation of time codes printed on the paper. Thus, a reviewer can read a time code from the transcript, and enter that time code directly into the VTR 530. For example, this can be done through remote controls into which one enters a time code. In this way, the reviewer can review portions of the video tape corresponding with the paper version of the transcript.

Figure 6:
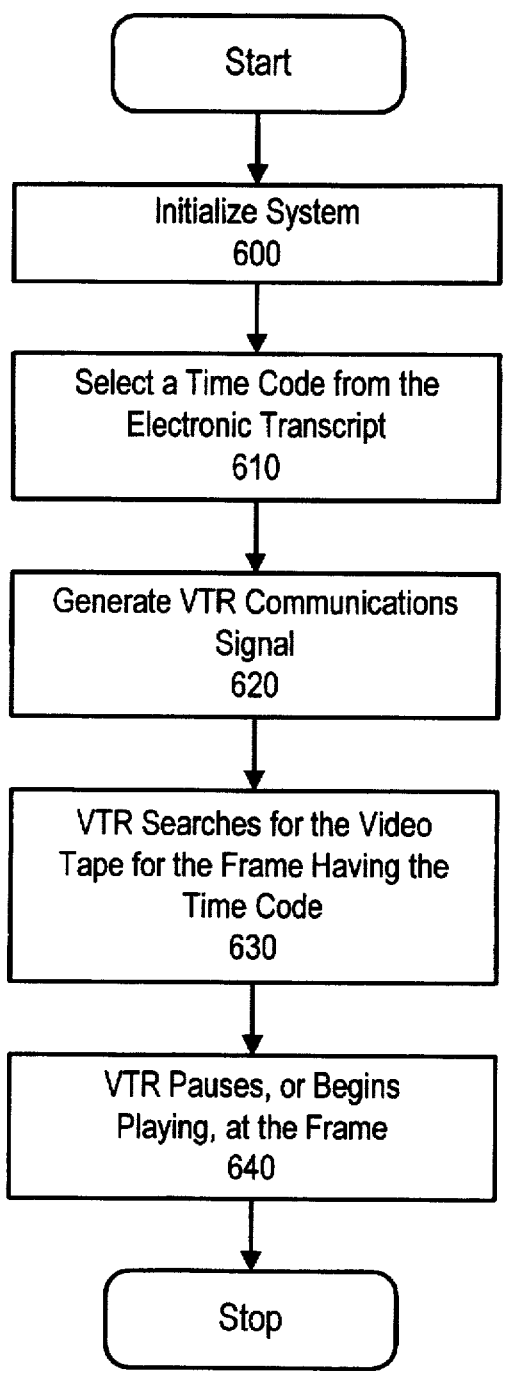
FIG. 6 illustrates an embodiment of a method of accessing a section of a video tape given textual data containing time codes.

An Embodiment of a Method of Accessing a Section of a Video Tape Given Textual Data Containing Time Codes FIG. 6 illustrates an embodiment of a method of accessing a section of video tape given textual data containing time codes. This method illustrates how one embodiment of the present invention simply, and efficiently, allows a reviewer to access a frame of a video record, given a corresponding textual recording.

At step 600, the system is initialized. Typically, this includes: loading a program onto computer 510 to display an electronic version of a transcript; inserting a video tape into VTR 530, and starting a program in computer 510 to communicate with VTR 530. Thus, computer monitor 520 displays a textual representation of the transcript, while video monitor 540 displays a video signal.

At step 610, a reviewer selects a time code on the computer monitor 520. This selection process typically includes directly selecting a textual representation of a time code. For example, a reviewer may select time code 00050218 (selection represented in bold):

...
Q. 00:05:02:18 Is John Smith your complete name? 00:05:03:25
...

However, in an alternate embodiment, where time codes are not displayed on computer monitor 520, the reviewer selects a position in the text and computer 510 finds the nearest non-displayed time code. Many techniques are known for selecting a position in text (e.g. selecting a word, inserting a cursor between characters, performing a keyword search, or performing a full text search). For example, a reviewer may select (selection represented in bold):

...
Q: Is John Smith your complete name?
...

Here, computer 510 chooses time code 00:05:03:25. In another embodiment, where computer 510 chooses the time code immediately before the selected text, computer 510 would choose time code 00:05:02:18. However, what is important is that some position in the text is selected by the reviewer. This allows computer 510 to acquire a time code associated with the textual position.

One skilled in the art would understand that any number of selecting techniques can be used (e.g. selecting with a mouse, selecting with a cursor, selecting using voice control, double clicking, high-lighting).

At step 620, computer 510 generates communications signal 590, in response to the reviewer selecting a time code. Communications signal 590 includes information regarding the selected time code.

At step 630, VTR 530 searches the video tape for the video frame corresponding to the specific time code.

At step 640, once the location has been found, VTR 530 can begin playing, or pauses, the video tape at the frame corresponding to the selected position in the transcript.

This embodiment of the present invention has a distinct advantage over the prior art. An absolute reference mark is used, not a series of pulses. Where a reviewer is reviewing a transcript that has also been recorded on multiple video tapes, the reviewer need only insert into VTR 530, the video tape generally corresponding with the section of the transcript being reviewed. By selecting a time code from the electronic version of the transcript, or by some other identification of a time code, the reviewer knows that the VTR 530 will frame, or sub-frame, search the video tape. VTR 530 will not have to rewind the entire tape and then scan forward, counting individual pulses, as in the prior art. Rather, VTR 530 will simply search forward, or backwards, from the present position of the video tape, to locate the corresponding frame. This removes the need to wait for the tape to rewind each time a different video tape is inserted in VTR 530.

As mentioned previously, the embodiments of the present invention employing industry standards have the following advantages: any VTR supporting the specific standard can be used; multiple formats of recording media can be used; standard duplicating techniques can be used to duplicate the recordings (these duplicates can then be used in the embodiments as if the duplicates were the original recordings).

In another embodiment of the present invention, continuous tracking occurs. For example, when a reviewer scrolls through the textual data, the video monitor 540 displays the corresponding frames of the video recording. In another embodiment, when the reviewer fast forwards, plays, or rewinds the video tape, computer monitor 520 displays the corresponding textual data. Thus, one recording continuously tracks, and displays, the portion being displayed of the other recording. In another embodiment, bi-directional tracking occurs when either recording is scanned, the other recording tracks.

Alternate Applications

Much of this description is devoted to a discussion of embodiments of the present invention used in the area of litigation support. However, given this description, one skilled in the art would understand that this invention has much broader application. For example, this invention can be used for recording presentations, and government proceedings. Essentially, this invention can be used in any field benefiting from correlating the simultaneous recording of a textual representation of the spoken word and some other recording of that spoken word.

This invention has even broader application. For example, in one embodiment, rather than receiving stroke data, the computer receives a first kind of data (e.g. scientific experimental data or a musical score). Simultaneously a video, audio, or some other recording, records another representation of the event from which the first kind of data is produced. In this embodiment, the computer associates time codes with the received data.

In another embodiment, a voice recognition system generates a textual representation of a person's speech, while a video camera, or some other recording device, generates a video record, or some other record, of the subject. This embodiment correlates the text from the voice recognition with the video record, or some other record, of the subject to be recorded.

In another embodiment of the present invention, a musical score can be recorded with the audio signal (and video signal) of a symphony playing that music. A user searches the score and locates the audio (and video) recording of the corresponding notes. This is particularly useful for conductors and composers when reviewing the performance of a musical work.

Another embodiment of the present invention is used in the field of education. For example, the text of a lecture is stored in a computer. When a user selects a portion of the text, the computer displays the video record of the lecture corresponding to the text. Similarly, the user can watch the video tape of the lecture while the corresponding text scrolls by.

A method and apparatus for efficiently synchronizing a first stream of data with a second stream of data has been described.

What is claimed is:

1. A method of inserting a timecode into a textual representation of a speech in a system, said system including a computer, a timecode generator, and videotape recorder, said computer coupled with said timecode generator and said videotape recorder, said method comprising:

outputting said timecode from said timecode generator at a time, said time corresponding to a portion of said speech;

storing, by said videotape recorder, a video representation of said portion with said timecode;

receiving, by said computer, a text data corresponding to said portion; and in response to receiving said text data, said computer automatically inserting the representation of said timecode into said text data.

2. The method of claim 1 wherein said receiving further includes said receiving a stenographic stroke data and wherein said inserting includes inserting a keycode representation of said timecode into said stenographic stroke data.

3. The method of claim 1 wherein said system includes a speech recognition system, said receiving further includes receiving a speech recognized text corresponding to said portion.

4. The method of claim 1 wherein said responsive to receiving said text data, inserting said representation of said timecode further includes testing said text data to determine whether said text data corresponds to a predetermined type of text data; and if said text data corresponds to said predetermined type of text data, then said inserting said representation of said timecode into said text data, and if said text data does not correspond to said predetermined type of text data, then not inserting said representation of said timecode into said text data.

5. The method of claim 4 wherein said testing includes said testing said text data to determine whether said text data is one of a question, an answer, a punctuation mark, a colloquy, and a speaker identifier.

6. The method of claim 4 where if said text data corresponds to said predetermined type of text data, then requesting said timecode from said timecode generator.

7. The method of claim 1 wherein said text data includes a one or more stenographic keystroke codes and wherein said inserting includes converting said timecode into a set of stenographic keystroke codes and inserting said stenographic keystroke codes into said text data.

8. The method of claim 7 wherein said timecode includes an hours value, a minutes value, a seconds value, and a fourth value, and where said converting said timecode into said set of stenographic keystroke codes includes:

converting the hours value to a corresponding first stroke code;

converting the minutes value to a corresponding second stroke code;

converting the seconds value to a corresponding third stroke code;

converting the fourth representation to a corresponding fourth stroke code;

inserting the first stroke code;

inserting the second stroke code;

inserting the third stroke code; and inserting the fourth stroke code.

9. The method of claim 1 wherein said inserting said representation of said timecode into said text data includes:

said converting said timecode into a text string representation of said timecode and inserting said text string into said text data.

10. The method of claim 1 wherein said system includes a sound recording device, said sound recording device being coupled to said timecode generator and wherein said method further includes said sound recording device storing sound information corresponding to said first portion with said timecode.

11. A system for matching a video recording of a speech with a textual recording of said speech, said system comprising:

a timecode generator, said timecode generator for generating a plurality of timecodes;

a video recorder being coupled to said timecode generator, said video recorder for capturing and storing said video recording of said speech with said plurality of timecodes;

a stenographic machine for outputting a plurality of keystroke codes corresponding to said speech;

a computer being coupled to receive said plurality of keystroke codes and said plurality of timecodes, said computer for receiving said plurality of keystroke codes and, in response to receiving said plurality of keystroke codes, said computer automatically inserting a plurality of timecode keystroke code sets into said plurality of keystroke codes, each timecode keystroke code set of said plurality of timecode keystroke code sets matching a different timecode of said plurality of timecodes.

12. The system of claim 11 wherein said timecode generator is a Society of Motion Picture and Television Engineers standard timecode generator.

13. The system of claim 11 wherein said timecode generator is part of said computer.

14. A method of inserting timecode keystroke codes into a stream of keystroke codes using a timecode generator and a computer, said computer being coupled to said timecode generator, said method comprising:

receiving a first keystroke code of said stream of keystroke codes;

responsive to receiving said first keystroke code, testing said first keystroke code to determine whether said first keystroke code is a predetermined keystroke code;

responsive to said first keystroke code being said predetermined keystroke code, requesting a timecode from said timecode generator, converting said timecode into said timecode keystroke codes, and said computer system automatically inserting said timecode keystroke codes into said stream near said first keystroke code; and storing said stream of keystrokes.

15. A method of inserting timecode keystroke codes into a stream of keystroke codes using a timecode generator and a computer, said computer being coupled to said timecode generator, said method comprising:

receiving a first keystroke code of said stream of keystroke codes;

testing said first keystroke code to determine whether said first keystroke code is a predetermined keystroke code;

responsive to said first keystroke code being said predetermined keystroke code, requesting a timecode from said timecode generator, converting said timecode into said timecode keystroke codes, and inserting said timecode keystroke codes into said stream near said first keystroke code;

storing said stream of keystrokes;

wherein further responsive to said first keystroke code, testing a second keystroke code to determine whether said second keystroke code is a second predetermined keystroke code, said second keystroke code immediately preceding said first keystroke code in said stream, if said second keystroke code is said second predetermined keystroke code, then not performing the steps of requesting said timecode, converting said timecode and inserting said timecode keystroke codes into said stream near said first keystroke code.

16. The method of claim 15 wherein said predetermined keystroke code is the same as said second predetermined keystroke code, and wherein said predetermined keystroke code is a punctuation mark.

* * * * *

UNITED STATES PATENT AND TRADEMARK OFFICE
CERTIFICATE OF CORRECTION

PATENT NO. : 5,701,153
DATED      : December 23, 1997
INVENTOR(S): Joshua A.S. Reichek and Avi J. Stachenfeld It is certified that error appears in the above-identified patent and that said Letters Patent is hereby corrected as shown below:

Title page, item number 75 (Inventors), change "Avi J. Stackenfeld" to --Avi J. Stachenfeld--;

Column 2, line 23, change "transits" to --transmits--;

Column 5, line 60, change "cede" to --code--;

Column 7, line 21, change "cede" to --code--;

Column 7, line 25, change "bode" to --code--;

Column 10, line 27, change "fast" to --first--;

Column 10, line 33, change "fie" to --file--; and,

Column 12, line 22, after "transcript" insert -- . --.

Signed and Sealed this

Twenty-eighth Day of April, 1998

*Attest:*

BRUCE LEHMAN

*Attesting Officer*     *Commissioner of Patents and Trademarks*